United States Patent
Sundaresan (10) Patent No.: US 10,115,109 B2
(45) Date of Patent: Oct. 30, 2018

(54) SELF CORRECTING ONLINE REPUTATION

(71) Applicant: eBay Inc., San Jose, CA (US)

(72) Inventor: Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 931 days.

(21) Appl. No.: 14/089,058

(22) Filed: Nov. 25, 2013

(65) Prior Publication Data
US 2014/0081681 A1  Mar. 20, 2014

Related U.S. Application Data (63) Continuation of application No. 11/635,894, filed on Dec. 8, 2006, now Pat. No. 8,615,440.

(60) Provisional application No. 60/807,183, filed on Jul. 12, 2006.

(51) Int. Cl.
G06Q 30/00 (2012.01)
G06Q 10/06 (2012.01)
G06Q 30/06 (2012.01)

(52) U.S. Cl.
CPC .......... *G06Q 30/01* (2013.01); *G06Q 10/063* (2013.01); *G06Q 30/06* (2013.01)

(58) Field of Classification Search
CPC ................................................. G06Q 30/0282
USPC .................................................. 705/347, 26.7
See application file for complete search history.

(56) References Cited

U.S. PATENT DOCUMENTS

| | | | |
|---|---|---|---|
| 7,310,641 B2 | 12/2007 | Moore et al. | |
| 7,519,562 B1* | 4/2009 | Vander Mey | G06Q 30/02 705/12 |
| 8,554,601 B1* | 10/2013 | Marsh | G06Q 30/0278 705/7.32 |
| 8,615,440 B2 | 12/2013 | Sundaresan | |
| 2002/0138402 A1 | 9/2002 | Zacharia et al. | |
| 2003/0074298 A1 | 4/2003 | Daum | |
| 2004/0225577 A1* | 11/2004 | Robinson | G06Q 30/02 705/14.1 |
| 2005/0144052 A1 | 6/2005 | Harding et al. | |
| 2006/0129446 A1* | 6/2006 | Ruhl | G06F 17/30873 705/306 |
| 2006/0271460 A1 | 11/2006 | Hanif | |
| 2007/0078671 A1* | 4/2007 | Dave | G06Q 10/10 706/45 |
| 2008/0015925 A1 | 1/2008 | Sundaresan | |
| 2008/0133417 A1* | 6/2008 | Robinson | G06Q 30/00 705/52 |

OTHER PUBLICATIONS

Seeley, John R, "The net of reciprocal influence; a problem in treating sociometric data", Canadian Journal of Psychology, 3(4), (Dec. 1949), 234-240 (Year: 1949).*

(Continued)

*Primary Examiner* — Matthew E Zimmerman
(74) *Attorney, Agent, or Firm* — Schwegman Lundberg & Woessner, P.A.

(57) ABSTRACT

A system to determine a first reputation value for a first user associated with a transaction with a second user first determines a weighted value based on one or more user transaction attributes. The user transaction attributes may be associated with at least one of the first user and the second user. Next the system calculates the first reputation value for the first user as a function of a first current reputation value of the first user and the weighted value.

18 Claims, 6 Drawing Sheets

(56) References Cited

OTHER PUBLICATIONS

"U.S. Appl. No. 11/635,894 Non-Final Office Action dated Oct. 14, 2010", 11.
"U.S. Appl. No. 11/635,894, Notice of Allowance dated May 13, 2011", 16 pgs.
"U.S. Appl. No. 11/635,894, Applicant Interview Summary filed Jun. 13, 2011", 1 pg.
"U.S. Appl. No. 11/635,894, Notice of Allowance dated Aug. 13, 2013", 10 pgs.
"U.S. Appl. No. 11/635,894, Response filed Jan. 14, 2011 to Non Final Office Action dated Oct. 14, 2010", 12 pgs.
Brin, S., et al., "The anatomy of a large-scale hypertextual Web search engine", Proceedings of the Seventh International World Wide Web Conference (WWW7 '98), (Apr. 1998), 107-117.
Kleinberg, Joe, "Authoritative Sources in a Hyperlinked Environment", Proc. Ninth Ann. ACM-SIAM Symp. Discrete Algorithms, (1998), 604-632.
Larson, R., "Bibliometrics of the World Wide Web: An exploratory analysis of the intellectual structure of cyberspace.", Annual Meeting of the American Society for Information Science, (1996), 1-13.
Seeley, John R, "The net of reciprocal influence; a problem in treating sociometric data", Canadian Journal of Psychology, 3(4), (Dec. 1949), 234-240.
Song, Shanshan, et al., "Trusted P2P Transactions with Fuzzy Reputation Aggregation", IEEE Internet Computing. Los Alamitos. vol. 9 Issue 6; p. 24, (Nov. 2005), 19 pgs.
Wasserman, S., et al., "Chapter 12—Network Positions and Roles", Social Network Analysis : Methods and Applications, (1994), 461-502.
Wasserman, S., Chapter 5—Centrality and Prestige, Social Network Analysis : Methods and Applications, (1994), 169-219.
U.S. Appl. No. 11/635,894, filed Dec. 8, 2006, Self Correcting Online Reputation, U.S. Pat. No. 8,615,440.

\* cited by examiner

SELF CORRECTING ONLINE REPUTATION

RELATED APPLICATION

This application is a continuation of U.S. application Ser. No. 11/635,894, filed Dec. 8, 2006, which claims the priority benefit of U.S. Provisional Patent Application Ser. No. 60/807,183, filed Jul. 12, 2006, and are both incorporated herein by reference in their entirety.

TECHNICAL FIELD

This application relates to a method and system for facilitating network-based transactions.

BACKGROUND

As online applications mature, users and merchants increasingly communicate and participate in a variety of transactions and commerce with each other. Buyers and sellers (e.g., individuals and merchants) transact with each other based on good faith and whatever knowledge they may have about each other as transacting parties and/or members of the transacting community. Absent any such knowledge may make one party or the other wearier of entering into a transaction with the other, which may in turn cause a transaction facilitator to lose valuable business.

BRIEF DESCRIPTION OF THE DRAWINGS

Embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

In various embodiments, a system and method to generate user reputation values includes a network system (e.g., a network-based marketplace) to calculate a reputation value of one or more users by applying a weighted value/factor based on one or more user transaction attributes to at least one of a feedback indicator left by one or more users for another user and a current reputation value. The user transaction attributes may be associated with a transaction between the one or more users and may include, but are not limited to, one or more from a group including a first user reputation value, a value of the transaction, prior transaction values associated with the first user, prior transaction values associated with the second user, number of prior transactions of the first user, number of prior transactions of the second user, group association of a user, community service (e.g., writes reviews, etc.), an imported reputation value, and a category of transaction.

In another embodiment, the network system receives from a second user a feedback indicator providing feedback about a first user, the feedback based on a transaction between the first user and the second user. The network system calculates a reputation value associated with the second user based on using a weighting function to determine a weighted value and applying the weighted value to the feedback indicator. The weighting function may use user transaction attributes to determine the weighted value to apply to the feedback indicator. In another embodiment, the feedback indicator may first be applied to the first user's current reputation value and then the weighted value applied to the first user's new current reputation value. In yet another embodiment, multiple feedback indicators may be provided pertaining to the first user by corresponding users associated with the transaction. A weighted value may be determined for each user providing a feedback indicator and used to determine (e.g., via aggregation) a new reputation value for the first user. Additionally, in a similar fashion, feedback indicators may be provided by each user for any or all of the others users associated with the transaction.

Although described herein as one user providing feedback for another user and an associated transaction, the systems and methods described herein may also be applicable to a user providing feedback or reviews about a product or service. For example, a user having a high reputation rating leaving feedback or providing a review associated with a product or a service may have a greater impact on a feedback value associated with the product, service, or review, than a user of a lower reputation rating. In one embodiment, reviews of products and services may be presented to a requesting user in a descending order with the review from the user with the highest reputation rating being listed first. In another embodiment, products and services may be presented to a requesting user in a descending order with the product or service as rated by the user with the highest reputation rating being listed first. In one embodiment, a weighting function may be used by a network-based marketplace to provide an overall rating of products, services, and reviews based on the reputation values of the users providing feedback.

Figure 1:
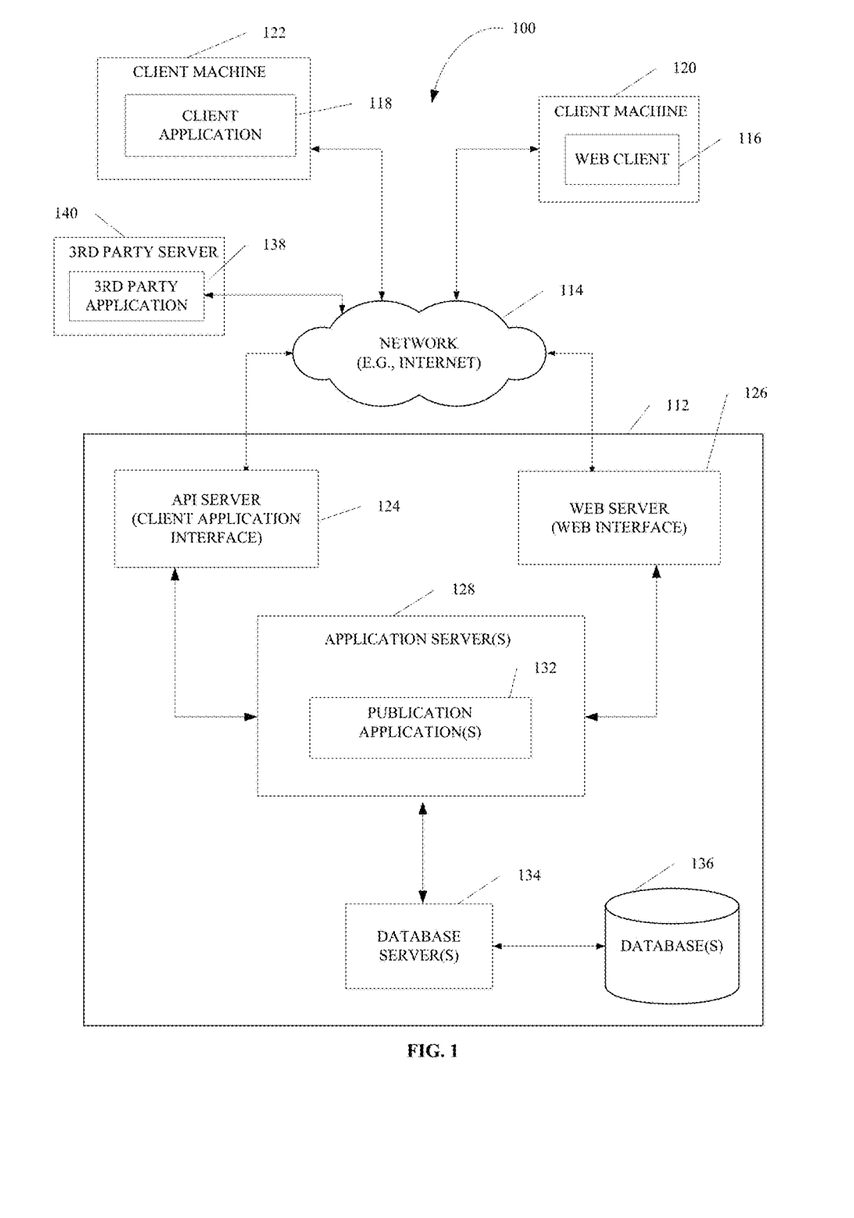
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a trading/commerce system where clients may communicate and exchange data with the trading/commerce system. The data may pertain to various functions (e.g., online purchases) and aspects (e.g., managing feedback indications and reputation values) associated with the network system 100 and its users. Although illustrated herein as a client-server architecture for simplicity, in other embodiments the network architecture may vary and include an architecture such as a peer machine in a peer-to-peer (or distributed) network environment.

A data exchange platform, in an example form of a network-based marketplace 112, may provide server-side functionality, via a network 114 (e.g., the Internet) to one or more clients. The one or more clients may include users that utilize the network system 100 and more specifically, the network-based marketplace 112, to exchange data over the network 114. These transactions may include transmitting, receiving (communicating) and processing data to, from, and regarding a multitude of users of the network system 100. The data may include, but is not limited to, feedback indicators, current user reputation values, user profiles, user transaction attributes, weighting functions and corresponding weighted values, product and service reviews, product, service, manufacture, and vendor recommendations and identifiers, product and service listings associated with buyers and sellers, auction bids, etc.

In various embodiments, the data exchanges within the network system 100 may be dependent upon user selected functions available through one or more client/user interfaces (UIs). The UIs may be associated with a client machine, such as a client machine 120 utilizing a web client 116. The web client 116 may be in communication with the network based publisher 112 via a web server 126. The UIs may also be associated with a client machine 122 utilizing a client application 118, or a third party server 140 hosting a third party application 138. It can be appreciated in various embodiments the client machine 120, 122 may be associated with a buyer, a seller, payment service provider or shipping service provider, each in communication with the network based publisher 112 and optionally each other. The buyers and sellers may be any one of individuals, merchants, etc.

Turning specifically to the network-based marketplace 112, an application program interface (API) server 124 and a web server 126 are coupled to, and provide programmatic and web interfaces respectively to, one or more application servers 128. The application servers 128 host one or more publication application (s) 132. The application servers 128 are, in turn, shown to be coupled to one or more database servers 134 that facilitate access to one or more database(s) 136.

In one embodiment, the web server 126 or the API server 124 may send and receive data pertaining to feedback and reputation via various user input tools. For example, the web server 126 may send and receive data to and from a toolbar or webpage on a browser application (e.g., web client 116) operating on a client machine (e.g., client machine 120). The API server 124 may send and receive data to and from an application (e.g., client application 118) running on another client machine (e.g., client machine 122).

The publication application(s) 132 may provide a number of marketplace functions and services (e.g., listing, payment, etc.) to users that access the network-based marketplace 112. For example, the publication application(s) 132 may provide a number of services and functions to users for reviewing and providing feedback about transactions and associated users. Additionally, the publication application(s) 132 may calculate a reputation value for a first user after a transaction based on using a weighting function to determine a weighted value to apply to a feedback indicator left by another user and applying the resulting value to the first user's current reputation value.

In one embodiment, the publication application(s) 132 may provide a user via a client (e.g., web client 116) with an interface that includes input fields for providing feedback regarding one or more other users associated with a transaction (e.g., a transaction involving multiple parties/users—a buyer, a seller, a shipping company, a payment company, etc.). For example, the user may evaluate the transaction (e.g., shipped quickly, responsive to questions, etc.) and select via the interface a feedback indicator based on the evaluation. In one embodiment, the feedback indicator is a numerical value selected from a set of predetermined values from an input control, such as a ring menu or checkbox. The feedback indicator may be received and processed at the network-based marketplace 112, or alternatively, if inputted using the client application 118, processed by the client application 118. However, one can imagine a transaction which involves multiple parties—a buyer, a seller, a shipping company, a payment company and so on.

FIG. 1 also illustrates a third party application 138 that may execute on a third party server machine 140 and may have programmatic access to the network-based marketplace 112 via the programmatic interface provided by the API server 124. For example, the third party application 138 may utilize information retrieved from the network-based marketplace 112 to support one or more features or functions (e.g., feedback and reputation functionality) on a website hosted by the third party. The third party website may, for example, provide one or more feedback, social networking, marketplace or payment functions that are supported by the relevant applications of the network-based marketplace 112.

Figure 2A:
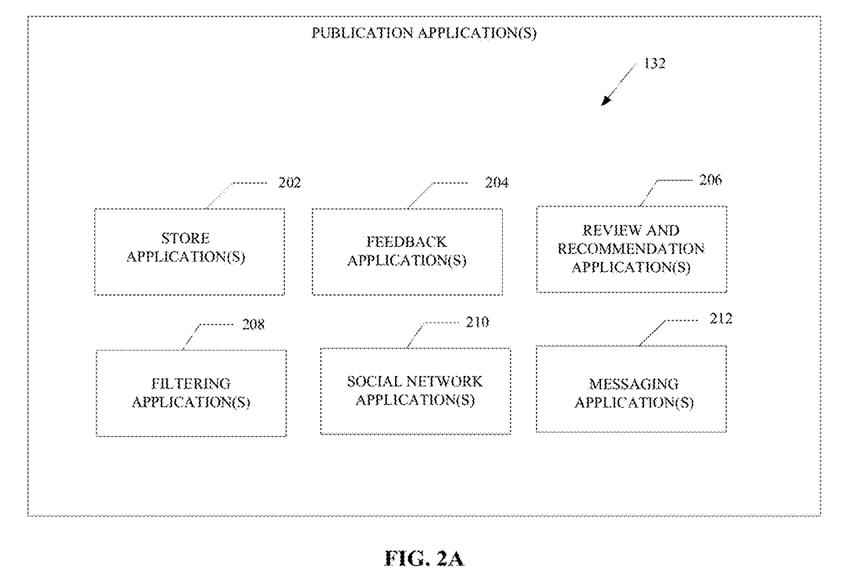
FIG. 2A is a block diagram illustrating an example embodiment of multiple publication application(s)

FIG. 2A is a block diagram illustrating an example embodiment of multiple publication application(s) 132, which are provided as part of the network-based marketplace 112. The network-based marketplace 112 may provide a multitude of feedback, reputation, social networking, and listing and price-setting mechanisms whereby a seller may list goods and/or services (e.g., for sale) and a buyer may buy listed goods and/or services.

The publication application(s) 132 are shown to include one or more application(s) which support the network-based marketplace 112, and more specifically, the generation of reputation values for users based on user transaction attributes associated with users participating in transaction in the network-based marketplace 112. In various embodiments as mentioned above, the user transaction attributes include, but are not limited to, a first user reputation value, a value of the transaction, prior transaction values associated with the first user, prior transaction values associated with one or more other users, number of prior transactions of the first user, number of prior transactions of the one or more other users, group association of a user, community service and participation (e.g., writes reviews, etc.), an imported reputation value, and a category of transaction.

These applications include support for activities associated with determining and providing feedback (e.g., feedback indicators) pertaining to users and associated transactions. In one embodiment, this includes determining one or more weighting functions and associated weighted values to apply to at least one of one or more feedback indicators pertaining to a first user provided by one or more users associated with the transaction and a current reputation value of the first user.

Additionally, the various applications may support social networking functions, including building and maintaining community groups joined or created by a user. For example, one of the social networking functions may be used to determine a weighting factor or value associated with a user creating and/or belonging to a community group. A user may have a higher rating in the community (e.g., more trustworthy) based on community participation and association (e.g., moderator, review publisher, etc.). The higher rating may then result in a higher weighted value over a user not participating in the community through group associations, leadership, etc.

Store application(s) 202 may allow sellers to group their listings (e.g., goods and/or services) within a "virtual" store, which may be branded and otherwise personalized by and for the sellers. Such a virtual store may also offer promotions, incentives and features that are specific and personalized to a relevant seller. In one embodiment, a seller using a virtual store to sell their goods and services may have a more desirable or higher weighted value for each transaction feedback indicator because of an inherent trustworthiness (e.g., higher reputation value) of a "business" over an individual seller.

Feedback application(s) 204 may allow parties that transact utilizing the network-based marketplace 112 to establish, build, and maintain reputations (e.g., in the form of reputation values), which may be made available and published to potential trading partners (e.g., users of the network-based marketplace 112). Consider, for example, where the network-based marketplace 112 supports person-to-person trading, users may have no history or other reference information whereby the trustworthiness and/or credibility of potential trading partners may be assessed. The feedback application(s) 204 may allow a first user, for example through feedback provided by other users, to establish a reputation within the network-based marketplace 112 over time and transactions. Thus, other potential transaction partners (users) may then reference the reputation value of the user for the purpose of assessing credibility, trustworthiness, etc.

In one embodiment, the feedback provided by other users about a first user may be used by the feedback application(s) 204 in conjunction with one or more weighting functions and user transaction attributes to determine a weighted value used to determine a new reputation value for the first user. In one embodiment, one or more weighting functions may be applied among all feedback indicators left by other users for the first user, such as negative, neutral, and positive, to produce a weighted value to apply to the user's current reputation value. For example, if the weighted value is less than zero it would result in a negative impact on the existing reputation value and conversely, if greater than zero a positive impact.

In other embodiments, the weighted value may be divided, added, or subtracted from the current user reputation value. In another embodiment, the weighting function applied to each feedback indicator produces a weighted value for each feedback indicator. Each weighted value may then be individually applied to the current user reputation value to generate the new user reputation value.

Each of the other user's weighting functions may be determined by their respective user transaction attributes. Thus, a user having a large number of positively rated prior transactions may result in a different weighting function applied to the user's feedback indicator than another user with more negative or neutral ratings on their prior transactions. In another embodiment, negative, neutral, and positive transactions may have different corresponding weighting functions as determined by the network-based marketplace 112.

For example, user A sells to user B and to user C, and user B and user C select the same feedback indicator value (e.g., +1). User B has a reputation value of 1000 while user C has a reputation value of 10. The resulting reputation value of user A based on the feedback indicator provided by user B will have a higher weighting function value than that of user C because user B is presumed to have a higher reputation (1000) in the system than user C (10). For similar reasons, according to one embodiment, user A may have a larger negative impact on reputation by a negative rating from user B than that of user C.

In another embodiment, a user's reputation may suffer based on past transaction ratings. For example, a user's reputation value may decline based on how many negative transactions the user has been a party to. In this embodiment, a feedback indicator is not provided by another user, however, the feedback application(s) 204 may determine a weighted value to be applied to the user's current reputation value based on the user's user transaction attributes, such as past transaction ratings or past feedback indicators provided about the other users in the transaction. Past transaction ratings may be derived based on one or more feedback indicators provided by each user involved in the transaction.

For example, user A has given negative feedback indicators to 4 of the user's last 5 transactees (other users). This may be used as an indication by the feedback application(s) 204, that user A may use bad judgment with respect to fellow transactees. Consequently, the user A's reputation value may decline. In one embodiment, the feedback application(s) 204 uses at least one weighting function and one or more of the user (the first user and other users) transaction attributes as described herein. It can be appreciated by one skilled in the art that any one or combination of user transaction attributes may be used by the feedback application(s) 204 in conjunction with a multitude of weighting functions (algorithms) to determine a user's (e.g., the first user's) reputation value.

In another embodiment, the reputation value for the first user may be adjusted by the feedback application(s) 204 irrespective of receiving a feedback indicator from another user participating in the transaction. For example, if the other user participating in the transaction does not leave feedback, the feedback application(s) 204 may by default assume, after a predetermined event (e.g., time limit), a neutral rating and apply one or more weighted values accordingly.

In an example embodiment, the network-based marketplace 112 may include review and recommendation application(s) 206. Social networking application(s) 210 may work in conjunction with the review and recommendation application(s) 206 to provide a user interface to facilitate the entry of reviews and recommendations of products and services to other users or communities/groups of users. A review may be a text entry of the community group member's opinion, a standard review form including check boxes indicating a level satisfaction, or a combination of both, etc.

Recommendations may include a specific type of item, a specific brand or service for a type of item, a specific retailer for the item, etc. In one embodiment, providing a community service, such as reviews and recommendations to the network-based marketplace 112 may result in a perception of a higher reputation or rating in the community (e.g., more trustworthy). This may be recognized by a weighting function determining a higher weighted value to calculate the first user's overall reputation value.

In one embodiment, filtering application(s) 208 may be used by a user to sort other potential transaction partners (users) by their current reputation values. For example, the user may want to target advertise a product or service to a user with a reputation value of 3 out of 5 stars. In another example, the user may require a user to use a specific payment option (e.g., credit card or PayPal®) to participate in a transaction. Additionally, filtering rules may be combinable or modifiable to broaden or narrow the scope of the results.

Messaging application(s) 212 may be used to generate and deliver messages to users of the network-based marketplace 112. These messages may be from the network-based marketplace 112 or from other users. For example, user may like a particular review, recommendation, product, or service offered by another user and may contact the user for additional information or inquiries. In one embodiment, the messaging application(s) 212 may be used in conjunction with the social networking application(s) 210 to provide promotional and/or marketing (e.g., targeted advertisements associated with the context) to users from other users, vendors and community members that may have offerings for the user. In another embodiment, the messaging application(s) 212 may be used for one user to request feedback from another user or users.

It can be appreciated that one or more of the various example publication application(s) 132 may be combined into a single application including one or more modules. Further, in some embodiments of the inventions one or more applications may be omitted and additional applications may also be included.

Figure 2B:
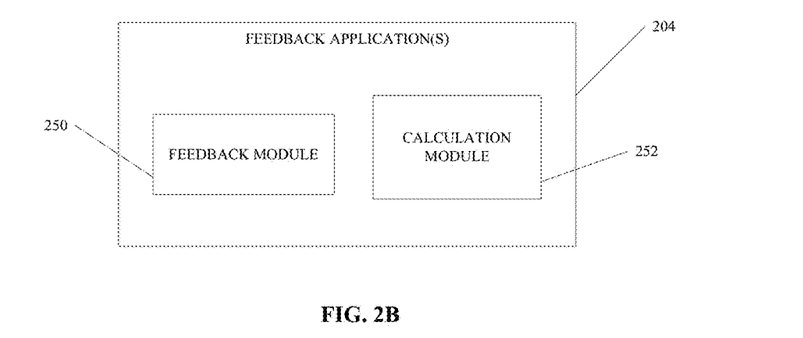
FIG. 2B is a block diagram illustrating an example embodiment of a feedback module and a calculation module which may be utilized by the feedback application(s) to determine a reputation value.

FIG. 2B is a block diagram illustrating an example embodiment of a feedback module 250 and a calculation module 252 which may be utilized by the feedback application(s) 204 to determine a reputation value. In one embodiment, the feedback module 250 may retrieve the first user's current reputation value and receive a feedback indicator from another user regarding a transaction associated with the users. The feedback module 250 may work in conjunction with the calculation module 252 to calculate a new reputation value for the first user based on a feedback function that uses the feedback indicator provided by the other user and a weighting algorithm. The weighting algorithm may use one or more user transaction attributes (e.g., transaction type, amount, other user's reputation value, etc.) associated with at least one of the first user and the other user.

As discussed above, there may be additional other users that provide one or more feedback indicators pertaining to the first user and the associated transaction. In other embodiments, the feedback module 250 and the calculation module 252 may operate in the feedback application(s) 204 executing on the network-based marketplace 112 or a stand alone application on a client computer in communication with the network-based marketplace 112.

Figure 3:
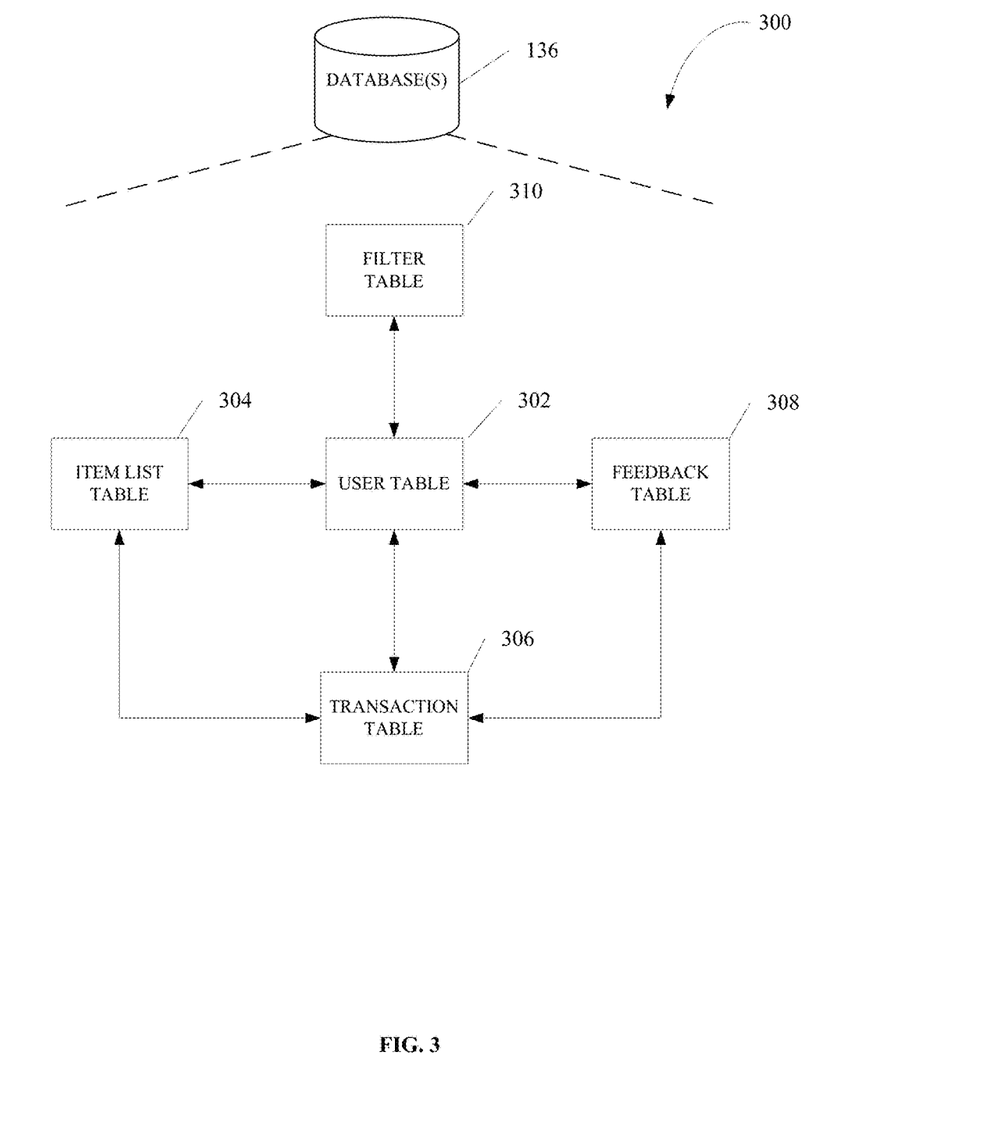
FIG. 3 is a high-level entity-relationship diagram illustrating an example embodiment of various tables that may be maintained within a database.

FIG. 3 is a high-level entity-relationship diagram illustrating an example embodiment of various tables 300 that may be maintained within the database(s) 136 (see FIG. 1). These tables may be utilized by and support the publication application(s) 132. A user table 302 may contain a record for each registered user of the network-based marketplace 112, which may include an identifier, an address and financial instrument information pertaining to each registered user. In one embodiment, a user operates as one or all of, a seller and a buyer (e.g., vendor or individual), within the network-based marketplace 112.

In one embodiment, an item list table 304 maintains listing or item records for goods and/or services that were created by a user using the item list application(s) 216. A transaction table 306 may contain a record for each transaction pertaining to items or listings for which records exist within the item list table 304. For example, the transaction table 306 may contain a purchase or sales transaction data of an item listed and sold in the network-based marketplace 112.

In one example embodiment, a feedback table 308 may be utilized by one or more of the feedback application(s) 204 to construct and maintain reputation information in the form of reputation values associated with users (e.g., members of a community group, sellers, etc.) of the network-based marketplace 112. In one embodiment, the reputation information or reputation values may be imported from other systems, such as another network-based marketplace or other system containing information pertaining to a user's credit and trustworthiness (e.g., a credit bureau, public agency, etc.). In this case, those imported values may be normalized by an application, such as the feedback application(s) 204. In another embodiment, a user may receive an endorsement (e.g., a feedback indication) from another user or entity that has knowledge of the user but does not necessarily transact with the user within the network-based marketplace 112.

A filter table 310 may be used by the filtering application(s) 208 to sort, filter, and store data associated with reputation values of users. Various types of filters and associated rules were discussed above with reference to the filtering application(s) 208 in FIG. 2A.

Figure 4:
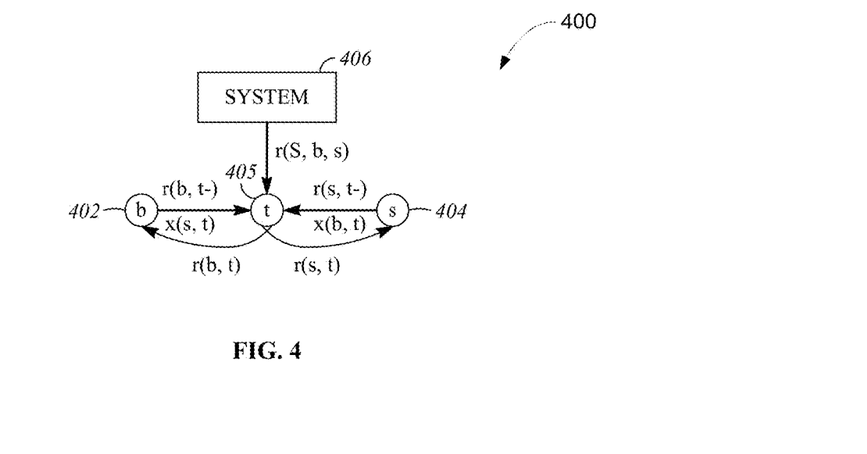
FIG. 4 illustrates a diagram of an example embodiment of a transaction network.

FIG. 4 illustrates a diagram of an example embodiment of a transaction network 400. The transaction network 400 further illustrates an embodiment of functional representations of the transaction, feedback and reputation for the buyer and the seller. As previously mentioned above, a transaction may involve multiple parties or users such as a buyer, a seller, a shipping company, a payment company, etc. For simplicity only two parties (users), buyer 402 and seller 404, are illustrated as participants in a transaction 405 on a transaction network 406 (e.g., network-based marketplace 112).

In one embodiment, the transaction space may be represented as a partial order since multiple transactions can take place at the same time with time used to define the order between transactions. Let $r(b,t-)$ and $r(s,t-)$ be the reputations (e.g., current reputation values) of the buyer 402 and the seller 404, respectively, as they come into the transaction 405. Let $x(b,t)$ be the transaction feedback indicator left by the seller 404 for the buyer 402 as part of the transaction and let $x(s,t)$ be the transaction feedback indicator left by the buyer 402 for the seller 404 as part of the transaction 405. A transaction weighting function may be used to determine the value of the transaction itself. In one embodiment, the transaction value may be determined from the function $f(t, b, s, r(b,t-), r(s,t-), x(b,t), x(s,t))$. The resulting value may be used alone or in addition to other weighting function results to compute an updated reputation value for the buyer 402 and the seller 404. In one embodiment, a weighting function as applied to the buyer (b) may be represented as the equation: $r(b,t)=g(f(t, r(b,t-), r(s,t-), x(b,t), x(s,t)), r(b,t-))$. The updated reputation value of the seller 404 may be similarly computed. In various other embodiments there may be multiple parties leaving transaction feedback indicators for each of the other parties. For example, there may be a buyer, a seller, and a shipper, each able to leave a transaction feedback indicator about the other. Each of the parties' feedback indications and user transaction attributes (e.g., number of transactions, transaction values, etc.) may be used to determine each of the individual user's reputation values.

In one embodiment, a closed form inverse arctan function may be used as a weighting function algorithm for determining a weighted value. For example, a*arctan(bx+c)+d. The arctan function itself bounds any number to the range (-pi/2, pi/2). The multiplier "a" may be used to amplify or dampen how the different parameters affect the reputation value and "d" may be used to provide a minimum impact on the reputation. In one embodiment, the arctan function is used to adjust the feedback based on a computed weight. The computed weight being a bound number affecting the overall impact of the function on the reputation value.

It will be appreciated in various embodiments many weighting function algorithms may be used to determine a weighted value based on user transaction attributes. For example, an updated reputation of a buyer may be a function of such user transaction attributes such as a past reputation (e.g., reputation value) of the buyer, the past reputation of the seller, the feedback of the seller, transaction parameters, and system parameters. The reputation of the transaction parameters might include the price of the item or service associated with the transaction. This may be combined with other user transaction attributes such as past transactions between the buyer and the seller, average selling price of items in the category, etc. For example, if the item sells for a significantly different price than what is typically sold, the contribution to the reputation by the transaction may be questionable. Other user transaction attributes may include the time between transactions of the user or how long between transactions for two users transacted. In one embodiment, if there is not a recent transaction, the impact of prior transactions may dampen in the new reputation values calculated for each user.

Figure 5:
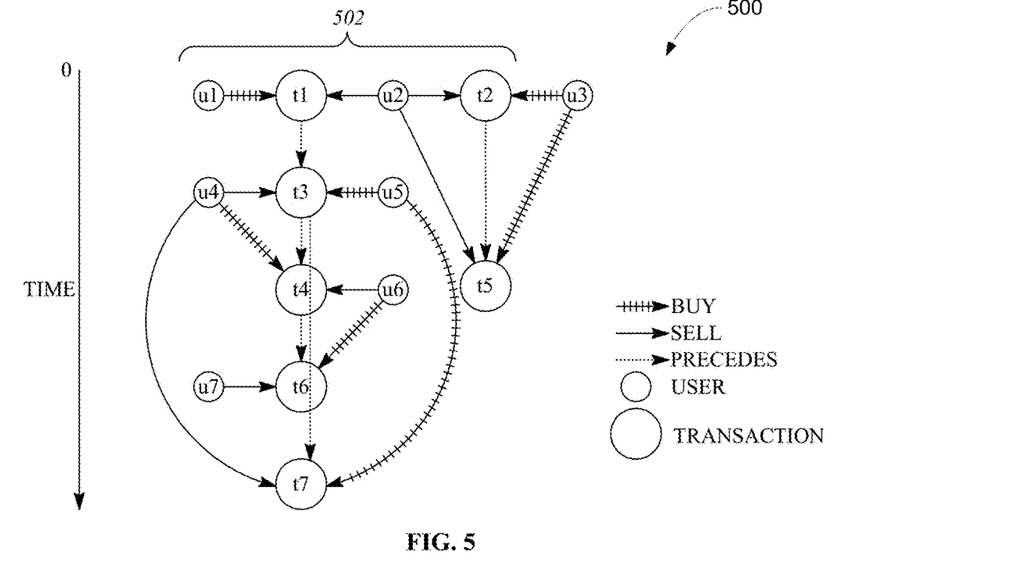
FIG. 5 illustrates a diagram of an example embodiment of a transaction network 500 involving buyers and sellers involved in several transactions.

FIG. 5 illustrates a diagram of an example embodiment of a transaction network 500 involving buyers and sellers involved in several transactions. Transactions are shown from top to bottom to illustrate a time sequence 502. In the partial graph, there is not a time dependency between t1 and t2. t3 follows t1 and t5 follows t2. t4 and t7 follow t3, and t5 follows t4. Users are labeled u1 through u7. An un-hashed arrow between a user node and a transaction node indicates that the user of the user node participates as a seller, while a hashed arrow indicates that the user of the user node participates as a buyer. In some transactions a user may participate as a buyer while in other transactions as a seller (e.g., u4 participates as a seller in t3 and as a buyer in t4).

Users may have repeat transactions together (u2 and u3 in t2 and t5 or u4 and u5 in t3 and t7). Users that have participated in a transaction prior to the current transaction bring in a reputation value into their new transaction. Users who have participated prior to the current transaction not only bring in their past reputation but also user transaction attribute data that may include past transaction reputation data. In one embodiment, the reputation of the current transaction may be affected by the fact that the buyer and seller have transacted in the past.

In one embodiment, a buyer and a seller having transacted in the past may void what the buyer and seller have to say about each other as a part of the current transaction. As a result, in various embodiments collusion between the buyer and the seller may be reduced. For example, a "cell phone" buyer or seller cannot falsely create transactions to boost the others reputation value. Alternatively, in another embodiment, the buyer may be a repeat buyer from the current seller and the repeat transactions may strengthen the reputation of the seller and possibly the value of the current transaction.

In one embodiment, a reputed buyer (e.g., a buyer with a high reputation value) that repeatedly purchases from the same seller actually strengthens their comment (e.g., feedback indicator) about the seller via a higher weighted value, as discussed above, to be associated with their feedback indicator. The weighted value may also depend on the feedback history between the parties as indicated by previous feedback provided by the buyer or the seller in prior transactions. For example, if a buyer u3 leaves a positive feedback for a seller u2 in a transaction t2, and then at a later transaction t5 leaves a negative feedback this may indicate the feedback has a higher weight than it would have been if the buyer and seller had not transacted before. However, if the buyer had a negative feedback on t2, then the feedback left by the buyer in t5 is of less value and the buyer has a lower reputation since he/she transacts with a seller whom he believed had a poor reputation.

Therefore, in various embodiments regarding multiple transactions between the buyer and the seller, the system (e.g., network-based marketplace 112) may use additional user transaction attributes such as aggregate, reputation, feedback and feedback trends in computing one or more weighted values used to determine a reputation value for a buyer and a seller. For example, the buyer may have had a good experience with the seller earlier followed by a poor experience in a later transaction. For buyers and sellers performing repeat transactions, overall reputation may be recognized by the system and applied in determining a weighted value and thus a new reputation value for a user (e.g., buyer and seller).

Figure 6:
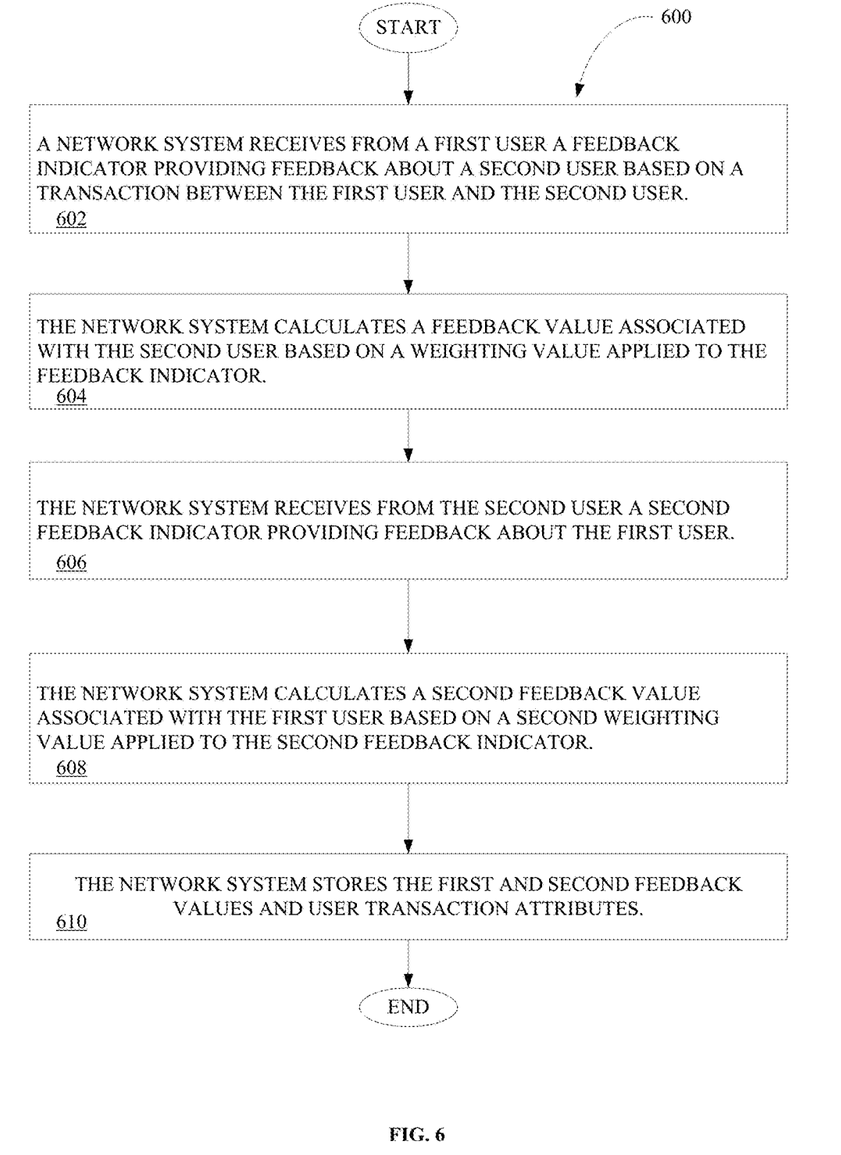
FIG. 6 is a flowchart illustrating, according to one embodiment, a method to calculate a reputation value for a user.

FIG. 6 is a flowchart 600 illustrating, according to one embodiment, a method to calculate a reputation value for a user. At operation 602 a network system (e.g., network-based marketplace 112) receives from a second user a feedback indicator providing feedback about a first user based on a transaction between the first user and the second user. The network system, at operation 604, calculates a reputation value associated with the first user based on determining a weighted value from weighting function and the feedback indicator. At operation 606, the network system receives from the first user a second feedback indicator providing feedback about the second user. The network system, at operation 608, calculates a second reputation value associated with the second user based on a second weighting function and the second feedback indicator. Finally, at operation 610, the network system stores the first and second reputation values in addition to any updated or new user transaction attributes (e.g., a transaction count between users, etc.) which may be used in subsequent user reputation calculations.

Figure 7:
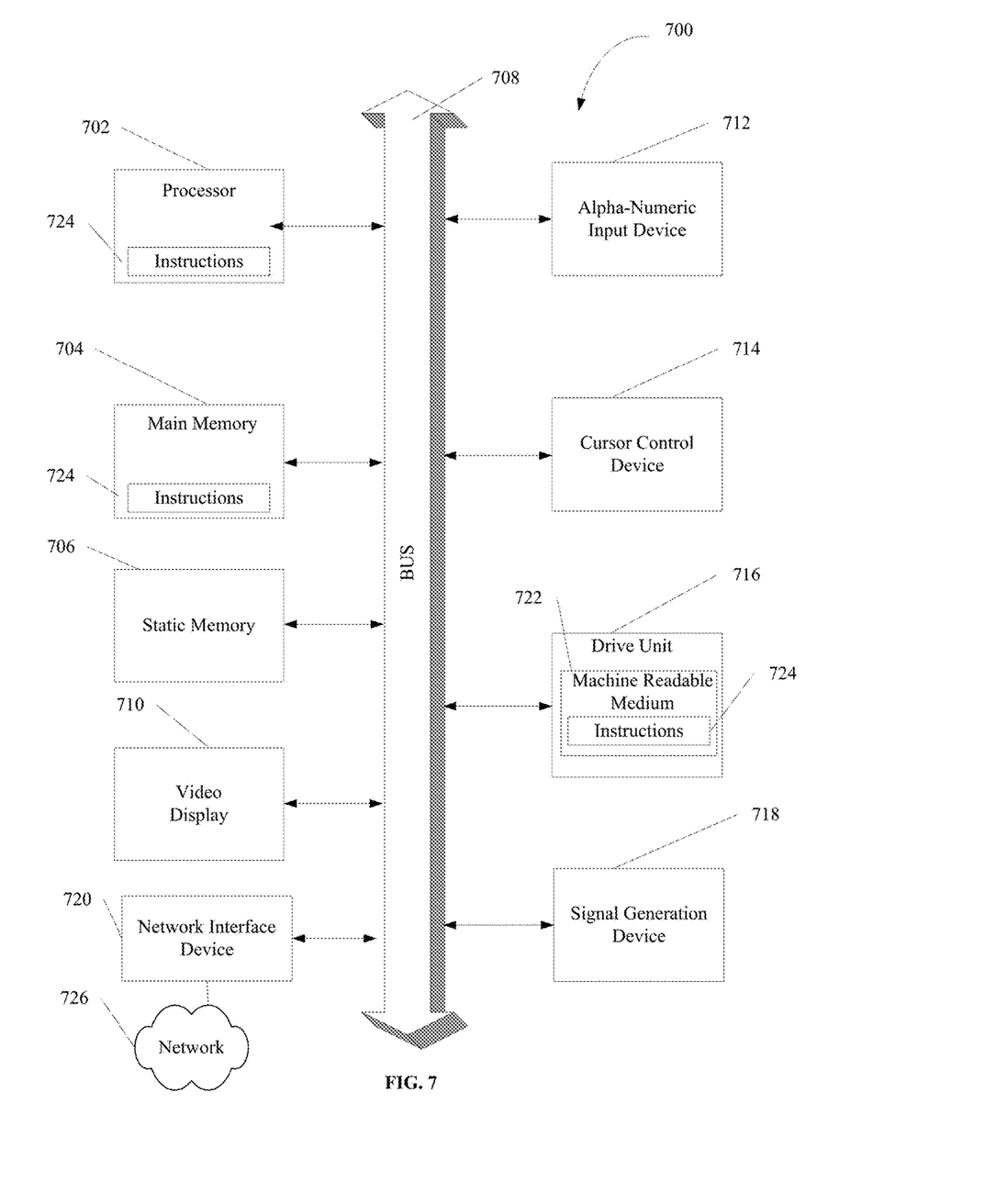
FIG. 7 shows a diagrammatic representation of machine in the example form of a computer system within which a set of instructions may be executed causing the machine to perform any one or more of the methodologies discussed herein.

FIG. 7 shows a diagrammatic representation of machine in the example form of a computer system 700 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The invention claimed is:

1. A method of dynamically calculating a product rating score of a particular product, comprising:
using one or more computer processors:
receiving, at an online marketplace server, from a client application associated to a user, a first feedback indicator associated with the particular product;
retrieving, from a product database, a current product rating score associated with the particular product;
retrieving, from a user database, a current first reputation score associated with the user;
determining, at the online marketplace server, a weighted value based on the current first reputation score associated with the user and the first feedback indicator;
dynamically calculating an updated product rating score as a function of a first current product rating score of the particular product and the weighted value;
displaying the updated product rating as part of the online marketplace;
storing, in the product database, the updated product rating score associated with the particular product;
receiving at the online marketplace server, from a client application associated to a second user, a second feedback indicator associated with the particular product;
retrieving, from the product database, the updated product rating score associated with the particular product;
retrieving, from the user database, a current second reputation score associated with the second user;
determining, at the online marketplace server, a second weighted value based on the current second reputation score associated with the second user and the second feedback indicator, wherein the current second reputation score associated with the second user is less than the current first reputation score associated with the user;
dynamically calculating a second updated product rating score as a function of the updated product rating score and the second weighted value, wherein a difference between the second updated product rating score and the updated product rating score is less than a difference between the updated product rating score and the first current product rating score;
displaying the second updated product rating as part of the online marketplace; and
storing, in the product database, the second updated product rating score associated with the particular product.

2. The method of claim 1, wherein displaying the updated product ratings as part of the online marketplace comprises:
displaying a plurality of product ratings for the particular product, sorted in descending order based upon a reputation value for users that provided the respective feedback indicators.

3. The method of claim 1, further comprising:
if the second user does not provide the second feedback indicator for the particular product after a predetermined time, assuming the second feedback indicator is a neutral feedback indicator.

4. The method of claim 1, further comprising:
receiving at least one of the feedback indicators from a social networking application, as at least one of a text entry of a group member's opinion and a standard review form including check boxes indicating a satisfaction level.

5. The method of claim 1, further comprising:
dynamically calculating an updated first reputation score of the user as a function of a current first reputation score of the user and the first feedback indicator;
storing, in the user database, the updated first reputation score associated with the user;
dynamically calculating an updated second reputation score of the second user as a function of a current first reputation score of the second user and the second feedback indicator; and
storing, in the user database, the updated second reputation score associated with the second user.

6. The method of claim 1, further comprising:
determining that the first feedback indicator is below a threshold value;
responsive to determining that the first feedback indicator is below the threshold value, determining that a plurality of past feedback indicators left by the user are also below the threshold value; and
responsive to determining that plurality of past feedback indicators left by the user are also below the threshold value, reducing the reputation of the user.

7. A system comprising:
a processor, and a memory including instructions, which when executed by the processor, cause the processor to perform operations comprising:

receiving at an online marketplace server, from a client application associated to a user, a first feedback indicator associated with a particular product;

retrieving, from a product database, a current product rating score associated with the particular product;

retrieving from a user database, a current first reputation score associated with the user;

determining, at the online marketplace server, a weighted value based on the current first reputation score associated with the user and the first feedback indicator;

dynamically calculating an updated product rating score as a function of a first current product rating score of the particular product and the weighted value;

displaying the updated product rating as part of the online marketplace;

storing, in the product database, the updated product rating score associated with the particular product;

receiving at the online marketplace server, from a client application associated to a second user, a second feedback indicator associated with the particular product;

retrieving, from the product database, the updated product rating score associated with the particular product;

retrieving from the user database, a current second reputation score associated with the second user;

determining at the online marketplace server, a second weighted value based on the current second reputation score associated with the second user and the second feedback indicator, wherein the current second reputation score associated with the second user is less than the current first reputation score associated with the user;

dynamically calculating a second updated product rating score as a function of the updated product rating score and the second weighted value, wherein a difference between the second updated product rating score and the updated product rating score is less than a difference between the updated product rating score and the first current product rating score;

displaying the second updated product rating as part of the online marketplace; and storing, in the product database, the second updated product rating score associated with the particular product.

8. The system of claim 7, wherein the operations for displaying the updated product ratings as part of the online marketplace further comprise:

displaying a plurality of product ratings for the particular product, sorted in descending order based upon a reputation value for users that provided the respective feedback indicators.

9. The system of claim 7, wherein the operations further comprise:

dynamically calculating an updated first reputation score of the user as a function of a current first reputation score of the user and the first feedback indicator;

storing, in the user database, the updated first reputation score associated with the user;

dynamically calculating an updated second reputation score of the second user as a function of a current first reputation score of the second user and the second feedback indicator; and storing, in the user database, the updated second reputation score associated with the second user.

10. The system of claim 7, wherein the operations further comprise:

if the second user does not provide the second feedback indicator for the particular product after a predetermined time, assume the second feedback indicator is a neutral feedback indicator.

11. The system of claim 7, wherein the operations further comprise:

receiving at least one of the feedback indicators from a social networking application, as at least one of a text entry of a group member's opinion and a standard review form including check boxes indicating a satisfaction level.

12. The system of claim 7, wherein the operations further comprise:

determining that the first feedback indicator is below a threshold value;

responsive to determining that the first feedback indicator is below the threshold value, determining that a plurality of past feedback indicators left by the user are also below the threshold value; and responsive to determining that the plurality of past feedback indicators left by the user are also below the threshold value, reducing the reputation of the user.

13. A non-transitory machine readable medium that stores instructions, which when performed by a machine, cause the machine to perform operations comprising:

receiving at an online marketplace server, from a client application associated to a user, a first feedback indicator from a user associated with a particular product;

retrieving, from a product database, a current product rating score associated with the particular product;

retrieving, from a user database, a current first reputation score associated with the user;

determining, at the online marketplace server, a weighted value based on the current first reputation score associated with the user and the first feedback indicator;

dynamically calculating an updated product rating score as a function of a first current product rating score of the particular product and the weighted value;

displaying the updated product rating as part of the online marketplace;

storing, in the product database, the updated product rating score associated with the particular product;

receiving at the online marketplace server, from a client application associated to a second user, a second feedback indicator associated with a second user for the particular product;

retrieving, from the product database, the updated product rating score associated with the particular product;

retrieving, from the user database, a current second reputation score associated with the second user;

determining, at the online marketplace server, a second weighted value based on the current second reputation score associated with the second user and the second feedback indicator, wherein the current second reputation score associated with the second user is less than the current first reputation score associated with the user;

dynamically calculating a second updated product rating score as a function of the updated product rating score and the second weighted value, wherein a difference between the second updated product rating score and the updated product rating score is less than a difference between the updated product rating score and the first current product rating score;

displaying the second updated product rating as part of the online marketplace; and storing, in the product database, the second updated product rating score associated with the particular product.

14. The machine readable medium of claim 13, wherein the operations of displaying the updated product ratings as part of the online marketplace further comprise:
displaying a plurality of product ratings for the particular product, sorted in descending order based upon a reputation value for users that provided the respective feedback indicators.

15. The machine readable medium of claim 13, wherein the operations further comprise:
if the second user does not provide the second feedback indicator for the product after a predetermined time, assume the second feedback indicator is a neutral feedback indicator.

16. The machine readable medium of claim 13, wherein the operations further comprise:
receiving at least one of the feedback indicators from a social networking application, as at least one of a text entry of a group member's opinion and a standard review form including check boxes indicating a satisfaction level.

17. The machine readable medium of claim 13, wherein the operations further comprise:
dynamically calculating an updated first reputation score of the user as a function of a current first reputation score of the user and the first feedback indicator;
storing, in the user database, the updated first reputation score associated with the user;
dynamically calculating an updated second reputation score of the second user as a function of a current first reputation score of the second user and the second feedback indicator; and
storing, in the user database, the updated second reputation score associated with the second user.

18. The machine readable medium of claim 13, wherein the operations further comprise:
determining that the first feedback indicator is below a threshold value;
responsive to determining that the first feedback indicator is below the threshold value, determining that a plurality of past feedback indicators left by the user are also below the threshold value; and
responsive to determining that the plurality of past feedback indicators left by the user are also below the threshold value, reducing the reputation of the user.

* * * * *

UNITED STATES PATENT AND TRADEMARK OFFICE
CERTIFICATE OF CORRECTION

PATENT NO. : 10,115,109 B2
APPLICATION NO. : 14/089058
DATED : October 30, 2018
INVENTOR(S) : Neelakantan Sundaresan It is certified that error appears in the above-identified patent and that said Letters Patent is hereby corrected as shown below:

In the Specification

In Column 1, Line 8, delete "2006,and" and insert -- 2006, and --, therefor.

In the Claims

In Column 12, Line 61, in Claim 6, after "that" insert -- the --.

In Column 13, Line 6, in Claim 7, delete "retrieving" and insert -- retrieving, --, therefor.

In Column 13, Line 7, in Claim 7, delete "user:" and insert -- user; --, therefor.

In Column 13, Line 24, in Claim 7, delete "retrieving" and insert -- retrieving, --, therefor.

In Column 13, Line 26, in Claim 7, delete "determining" and insert -- determining, --, therefor.

In Column 14, Line 24, in Claim 13, delete "Anon-transitory" and insert -- A non-transitory --, therefor.

Signed and Sealed this
Twelfth Day of February, 2019

Andrei Iancu
*Director of the United States Patent and Trademark Office*